Figure 1:
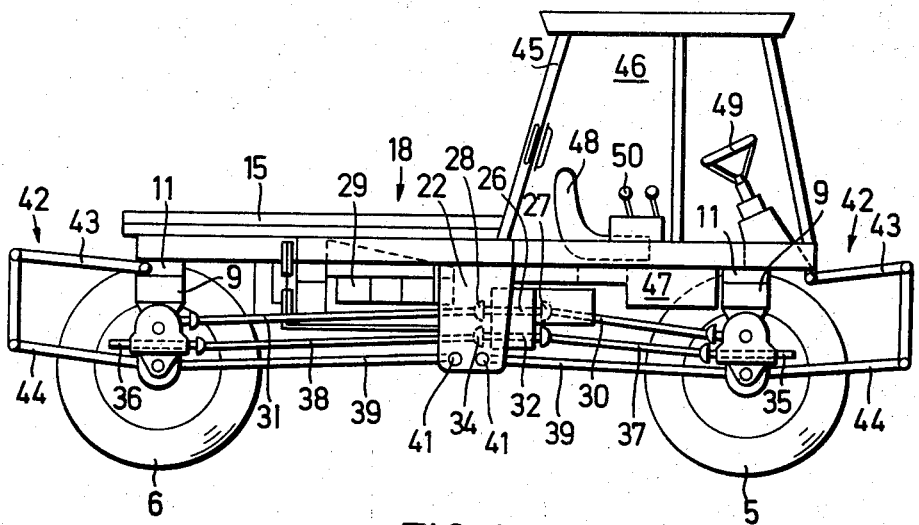

United States Patent

Gego

[11] 3,833,079
[45] Sept. 3, 1974

[54] VEHICLE, ESPECIALLY MOTOR VEHICLE FOR AGRICULTURAL PURPOSES

[75] Inventor: Arno Gego, Aachen, Germany

[73] Assignee: Klockner-Humboldt-Deutz Aktiengesellschaft, Cologne, Germany

[22] Filed: Aug. 14, 1973

[21] Appl. No.: 388,229

[30] Foreign Application Priority Data
Aug. 17, 1972 Germany............................ 2240415

[52] U.S. Cl............................ 180/44 F, 180/64 R
[51] Int. Cl............................................. B60k 17/34
[58] Field of Search............................ 180/42–50, 180/54 D, 64 R; 267/66, 67

[56] References Cited
UNITED STATES PATENTS

| | | | |
|---|---|---|---|
| 2,746,762 | 5/1956 | Scholtze............................ | 267/67 X |
| 2,853,142 | 9/1958 | Röszler et al. ................. | 180/44 R X |
| 2,996,135 | 8/1961 | Grabow............................ | 180/44 F |
| 3,613,816 | 10/1971 | Gutbrod............................ | 180/45 X |
| 3,690,395 | 9/1972 | Spiller et al....................... | 180/45 X |

FOREIGN PATENTS OR APPLICATIONS
690,989   7/1964   Canada................................ 180/42

*Primary Examiner*—Lloyd L. King
*Assistant Examiner*—Andres Kashnikow
*Attorney, Agent, or Firm*—Walter Becker

[57] ABSTRACT

A vehicle, especially for agricultural purposes, having a frame with front and rear axles resiliently supported therebeneath and with a driving unit in the frame in about the middle of the length of the frame. The driving unit includes an engine having the crankshaft extending in the fore and aft direction of the frame and offset laterally from the longitudinal center of the frame. A hydrostatic pump is connected to the crankshaft and a hydrostatic motor in circuit with the pump drives through a geared transmission to the axles. Wishbone shaped brace members have the free ends of the legs connected to the axles and extend in about the same horizontal plane to the longitudinal center of the frame and are pivotally connected to the frame near the center thereof.

10 Claims, 2 Drawing Figures

PATENTED SEP 3 1974  3,833,079

VEHICLE, ESPECIALLY MOTOR VEHICLE FOR AGRICULTURAL PURPOSES

The present invention relates to a vehicle, especially motor vehicle for agricultural purposes as for instance for pulling, pushing and/or carrying implements the front or rear side of which is through linkage means of an implement connecting device linked to the vehicle frame and one of the two driving axles resiliently arranged on said frame, said driving axles being provided with a rigid axle body. More specifically, the invention relates to a vehicle of the above mentioned type in which the drive is effected from a multi-cylinder internal combustion engine, which is located between said driving axles, through the intervention of a torque converter having an adjustable transmission ratio, and a power branch while each of the two driving axles is supported by longitudinal linkage means.

In agriculture there exists the problem by means of a motor vehicle of the above mentioned type to work the soil of large surfaces acreage by implements mounted on and connected to both the front as well as the rear end of the implement. Moreover, it should be possible by the same vehicle to carry out transporting as well as loading operations in an economical manner while the vehicle should afford the best possible driving comfort for the driver. When employing a motor vehile of the above mentioned type for working the soil, especially during cultivating operations with implements arranged at the front end or the rear of the vehicle, it has been found that for the operation of such implements without supporting wheels and for the optimum exploitation of the vehicle, an operation which is free from oscillations in up and down direction is a necessity.

Furthermore, when employing a vehicle of the above mentioned type for working the soil as well as for transporting purposes, it has been found that the position of the driving unit, especially the location of the center of gravity has a considerable influence upon the oscillating behavior of the vehicle frame and also upon the platform or the cab for the driver.

Based on these findings, it is an object of the present invention to improve a vehicle of the above mentioned type to such an extent that the driving unit forming the main masses of the total cushioned masses can provide an operation free from oscillations in vertical direction. There is provided a driver stand free from vibrations and for possibly uniform dynamic axle loads with relatively large cushioned masses. The same is so designed ad arranged that the pull and pressure forces absorbed by each driving axle, including such forces which originate with the attached implements, will be absorbed in the center of the up and down movements of the vehicle possibly rectilinearly and directly by the frame in a manner nearly free of moments and vertical forces for the driving implement.

These and other objects and advantages of the invention will appear more clearly from the following specification in connection with the accompanying drawing, in which:

FIG. 1 diagrammatically illustrates a side view of a motor vehicle according to the invention.

Figure 2:
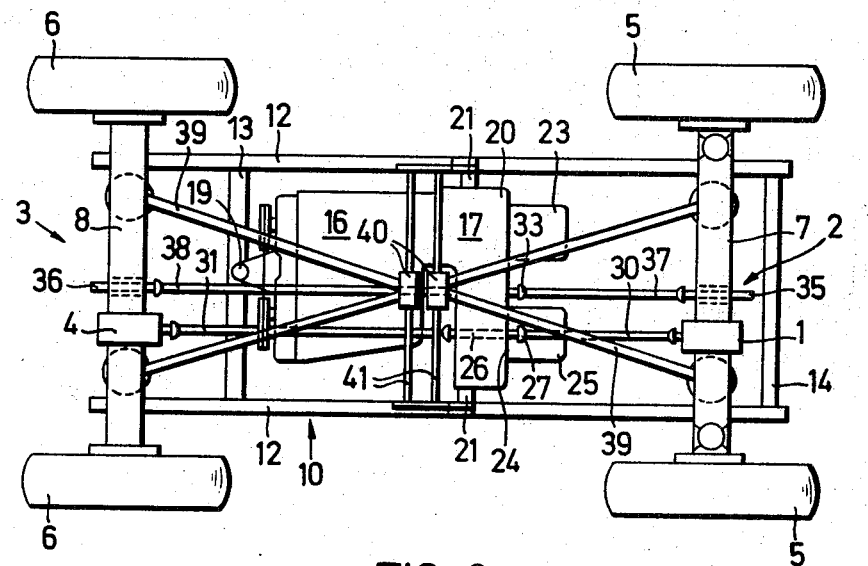

FIG. 2 is a bottom view of the driving mechanism and the driving circuit of the motor vehicle according to FIG. 1.

The vehicle according to the present invention is characterized primarily by the combination of the following features:

a. The internal combustion engine has its crank shaft parallelly offset with regard to the longitudinal central axis of the vehicle and has its cylinders arranged at an incline below and/or within the vehicle frame with regard to the output shaft of the torque converter.

b. The torque converter has an infinitely variable hydrostatic torque converter part with a pump part coaxially arranged with regard to the crank shaft of the internal combustion engine and with a hydrostatic motor part which is laterally offset with regard to said pump part in the direction of the longitudinal central axis of the vehicle.

c. The longitudinal guiding means are below the driving unit comprising the internal combustion engine and the torque converter supported on the vehicle frame in such a manner that the lines of action of the supporting forces transmitted by the driving axles extend approximately or in a common horizontal plane.

By the cooperation and the combination of the structural elements designed in this manner, a vehicle of the above mentioned type is improved in that with such vehicle an operation of the vehicle is assured which is for all practical purposes free from pitching oscillations and free from oscillations in the steering direction while affording a maximum of driving comfort and an optimum of power exploitation. This will be realized primarily in that with variations in the pulling force due to changes of the rolling plane or changes in the working depth of a soil working implement at the front or rear of the vehicle, the pulling and pressing forces absorbed by the driving axles are with their vectors nearly free of moments, for the entire driving unit absorbed directly by the structural elements for the suspension of the soil working implement. In addition thereto, the construction according to the present invention brings about the possibility of arranging a platform for the driver which with regard to its construction volume and with regard to sight conditions represent an optimum for the driver and the passenger. This platform may be provided with or without cab sections at the front side of the vehicle with an optimum saddling or hitching space at the rear of the vehicle for saddling or hitching implements.

The stability against pitching oscillations and the safety against tilting of the vehicle is according to a further development of the invention greatly increased by the fact that the driving unit of the vehicle is with its center point arranged centrally between the driving axles within or below the vehicle frame.

For an optimum distribution of the output of the driving unit when working the soil as well as during transporting operations, it is in conformity with a further development of the invention provided that the torque converter is designed as a hydrostatic mechanical transmission with a hydrostatic torque converter part provided between the front driving axle and the mechanical converter part.

For purposes of guiding the driving axles on the vehicle frame in a simple manner and at low costs, it is provided according to the present invention that the longitudinal guiding means associated with each driving axle are designed as triangular guiding means and have their ends which face away from the driving axles supported approximately within the region of a vertical line of action extending approximately through the center point of the driving unit, by means of a spherical joint respectively. A solution which is particularly advantageous for the behavior of the pitching oscillations of the vehicle has according to the present invention been realized by the fact that the ends of the two triangular guiding means which face away from the driving axles are respectively supported by a spherical joint on a common pivot axle of the vehicle frame or a structural element thereof.

For economically manufacturing the vehicle, it is furthermore expedient that the two triangular guiding means are so designed that they can be exchanged for each other and that the axles of the spherical joints at the frame side are arranged in series with regard to each other while being slightly spaced from each other. In connection with the manufacturing of the vehicle, it is furthermore advantageous that as holding means for the spherical joints of the triangular guiding means, two traverses are employed which are located one behind the other and are held on pull struts of the vehicle frame which pull struts are vertical on both sides of the vehicle frame.

In conformity with the present invention, it is furthermore suggested that the driver's stand of the vehicle includes a platform which is located between the front driving wheels and through the torque converter extends approximately to the internal combustion engine of the driving unit. Preferably, the driver's stand has a step or tub-shaped platform.

Referring now to the drawings in detail, the motor vehicle according to FIGS. 1 and 2 has a front guidable driving axle 2 which is provided with an eccentric axle differential 1. The motor vehicle of FIGS. 1 and 2 furthermore comprises a rear axle 3 with an eccentric axle differential 4. The driving axle 3 corresponds in its fundamental construction to that of the driving axle 2. The two driving axles 2 and 3 form rigid axles designed in the manner of a gate and serve for driving the front driving axle wheels 5 and rear driving wheels 6 which as to their dimensions preferably correspond to the wheels 5.

The two driving axles 2 and 3 are respectively connected to a vehicle frame 10 through the intervention of two springs 9 each, which are on both sides of the axle differentials 1, 4 firmly connected to the rigid shaft bodies 7, 8 thereof. The springs 9 may be designed for instance as helical springs or may be designed as block-shaped rubber springs as indicated in the drawing. The springs 9 have their upper ends vertically supported by a front or rear traverse 11, 11 of the vehicle frame 10. The vehicle frame 10 is furthermore provided with longitudinal walls 12 which by means of the traverses 11 of one of the rear driving axles 3 are connected to each other by a traverse 13 and a traverse 14 spaced from the traverse 13 and arranged at the front side. The rear portion of the vehicle frame 10 serves for receiving a loading platform 15 with non-illustrated catching and collecting element for hitching devices such as a sprayer container, supply bunker or the like.

Between the two driving axles 2 and 3 and partially between the longitudinal walls 12, there is provided a driving unit 18 which is primarily located below said longitudinal walls 12. Said driving unit 18 comprises an internal combustion engine 16 and an infinitely variable torque converter 17 with a power branch-off. The center of gravity of the driving unit 18 is located below the vehicle frame 10 approximately centrally between the two driving axles 2 and 3. At the rear end of the vehicle, the driving unit 18 is through the internal combustion engine 16 journalled in an elastic bearing 19 of the traverse 13 and is journalled within the region of the torque converter 17 through the intervention of housing 20 thereof in elastic bearings 21 of vertical pull struts 22 of the vehicle frame 10. The vertical struts 22 extend from the longitudinal walls 12 of the vehicle frame 10 in downward direction approximately up to a horizontal plane which extends through the lower edges of the axle body 7, 8 of the two driving axles.

The internal combustion engine 16 is with its crank shaft extending parallel to the central axis of the vehicle length offset in the direction toward the outside. The torque converter 17 of the driving unit 18 is preferably designed as a hydrostatic mechanical transmission which comprises a pump part 23 that is connected to the housing 20 of the torque converter 17 in a coaxial manner with regard to the crank shaft. The hydrostatic mechanical transmission has a hydrostatic motor part 25. This motor part 25 has its output shaft laterally offset beyond the longitudinal central axis of the vehicle when viewed from the end face of the pump part 23. The hydrostatic motor part 25 is connected to the front end face 24 of the housing 20. The motor part 25 is intended for the drive of a non-illustrated two-step gear transmission which is arranged with the housing 20 on that side which faces the motor part 25. The two-stage group transmission has an output shaft 26 with a front and a rear connection 27, 28 respectively for a universal joint shaft. The axis of the output shaft 26, which represents the output shaft of the torque converter 17, is in conformity with the present invention located below the cylinders 29 of the internal combustion enging 16, which cylinders 29 are inclined with regard to the axis of the output shaft 26. The universal joint shaft connection 27, 28 is through a universal joint shaft 30, 31 connected to the drive shaft of the axle differentials 1, 4 of the front driving axle 2 and rear driving axle 3 respectively.

In the housing 20 of the torque converter 17 and, more specifically, on that side which faces the pump part 23, there is provided a non-illustrated two-step power takeoff transmission with a friction clutch which has an output shaft 32 with a front universal joint shaft connection 33 and a rear joint shaft connection 34. The output shaft 32 is located between the pump part 23 and the motor part 25. The output shaft 32 of the power takeoff shaft transmission is through the connections 33, 34 connected to a power takeoff shaft end 35, 36 through a joint shaft 37, 38. Said power takeoff shaft end 35, 36 is respectively arranged in the axial body 7,8 of the front driving axle 2 and rear driving axle 3 respectively. The two driving axles 2 and 3 are in conformity with the present invention through a triangular guiding member 39 supported by means of a spherical joint 40 on a transverse yoke 41 below the driving unit 18. The two transverse yokes 41 are arranged one behind the other and are connected to the vertical pull struts 22 below the torque converter in such a way that the spherical joints 40 are located approximately within the region of the vertical line of action of the center of gravity of the driving unit 18. Furthermore, the transverse yokes 41 are so arranged with regard to the two driving axles 2, 3 that the pull and pressure forces which are effective in the two triangular guiding means 39 and which belong to the two driving axles 2, 3 and have their origin in their power transfer and the supporting forces of a working implement at the front or rear of the vehicle, are with their line of action located approximately in a common plane which extends through the pitching center of the vehicle. In this way, pitching oscillations of the vehicle according to the invention are practically eliminated.

Furthermore, the vehicle according to FIGS. 1 and 2 is at the front and rear side provided with a device for hitching implements, said device being designed as a three-point hitching rod system 42. Each three-point hitching linkage system 42 has an upper guide 43 which is connected to frame 10 by means of a non-illustrated ball joint. Furthermore, each three-point hitching ball system 42 has two lower guiding means 44 which are connected to the axle body 7, 8 respectively by means of non-illustrated ball joints. The two three-point hitching bar systems 42 serve for connection of implements which are selectively operable through the invention of the power takeoff shaft ends 35 and 36 respectively. The control of these implements as well as of the vehicle is effected from a driver system 46 which is provided with a cab 45. The system 46 is preferably arranged between the driving unit 18 and that side of the vehicle where a particularly good sight exists toward the working implement on the front side of the vehicle. The driver system 46 has a platform which is designed in the manner of a stepped bottom pan 47. The lower-part of the platform is at a slight distance located above the axle body 7, whereas a rear step which receives the driver's seat 48 is at a slight distance located directly above the pump part 23 or motor part 25 of the torque converter 17. Furthermore, the driver's stand 46 has a guiding device 49 and control devices 50 as well as non-illustrated pedals for the brakes and the clutch of the power takeoff shaft transmission of the vehicle. It may be mentioned that the two triangular guiding means 39 for the guiding of the two driving axles 2, 3 may in an advantageous manner also be supported by a common transverse yoke 41 by means of their spherical joints 40.

It is, of course, to be understood that the present invention is, by no means, limited to the specific showing in the drawing but aso comprises any modifications within the scope of the appended claims.

What is claimed is:

1. A vehicle, especially for argicultural purposes and comprising; a frame, front and rear axles resiliently supported on said frame and beneath the frame, a driving unit in the frame between said axles comprising a multicylinder internal combustion engine having the crankshaft extending in the fore and aft direction and offset laterally from the central longitudinal axis of the frame, a variable hydrostatic pump coaxial with and driven by said crankshaft, a hydrostatic motor in circuit with said pump and laterally offset therefrom in a direction opposite to the direction of offset of said crankshaft from the central axis of said frame, and a power transmission driven by said hydrostatic motor and drivingly connected to both of said axles, bracing guide members for said axles each connected at one end to a respective axle and extending therefrom toward the longitudinal central region of the frame, and means fixed to the frame in about the longitudinal central region thereof and connected to the other ends of said guide members, said guide members extending in substantially the same horizontal plane beneath said driving unit.

2. A vehicle according to claim 1 in which the center of gravity of said driving unit is located about midway between said axles and is at a height not greater than that of said frame.

3. A vehicle according to claim 1 in which said pump and motor are located between said front axle and said power transmission.

4. A vehicle according to claim 1 in which each of said guide member is triangular with the apex toward the longitudinal center of the frame, said means fixed to said frame including ball joints at the apices of said triangular guide members, said ball joints being near the vertical plane containing the center of gravity of said driving unit.

5. A vehicle according to claim 1 in which each of said guide members is triangular with the apex toward the longitudinal center of the frame, said means fixed to said frame including spherical joints at the apices of said triangular guide members, lateral shaft means carried by the frame and engaging said spherical joints, said spherical joints being near the vertical plane containing the center of gravity of said driving unit.

6. A vehicle according to claim 1 in which each of said guide members is triangular with the apex toward the longitudinal center of the frame, said means fixed to said frame including sperical joints at the apices of said triangular guide members, lateral shaft means carried by the frame and engaging said spherical joints, said guide members being of the same size and being interchangeable, said spherical joints being closely spaced in the fore and aft direction of the frame.

7. A vehicle according to claim 1 in which each of said guide members is triangular with the apex toward the longitudinal center of the frame, said means fixed to said frame including spherical joints at the apices of said triangular guide members, lateral shaft means carried by the frame and engaging said spherical joints, plate members fixed to and dependant from said frame at opposite sides thereof and stiff in the fore and aft direction of the frame, the ends of said shaft means being mounted is said plate member.

8. A vehicle according to claim 1 which includes an operators station on said frame toward the front end thereof extending from near the front end of said engine to near the front axle.

9. A vehicle according to claim 8 in which said station includes a floor which has a first portion at the rear at a higher elevation and a second portion at the front at a lower elevation.

10. A vehicle according to claim 1 in which the cylinders of said engine incline upwardly toward the longitudinal central axis of the frame.

* * * * *